No. 795,425. PATENTED JULY 25, 1905.
A. J. BOWERS.
METHOD OF MAKING BIFOCAL LENSES.
APPLICATION FILED MAR. 13, 1905.

Witnesses
Roy D. Tolman.
Penelope Comberbach.

Inventor
Albert J. Bowers.
By Rufus B. Fowler
Attorney

UNITED STATES PATENT OFFICE.

ALBERT J. BOWERS, OF WORCESTER, MASSACHUSETTS.

METHOD OF MAKING BIFOCAL LENSES.

No. 795,425.        Specification of Letters Patent.        Patented July 25, 1905.

Application filed March 13, 1905. Serial No. 249,752.

*To all whom it may concern:*

Be it known that I, ALBERT J. BOWERS, a citizen of the United States, residing at Worcester, in the county of Worcester and Commonwealth of Massachusetts, have invented a new and useful Improvement in Methods of Making Bifocal Lenses, of which the following is a specification, accompanied by drawings forming a part of the same, in which—

Figure 1:
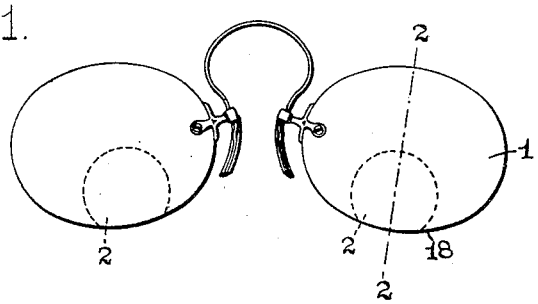
Figure 2:
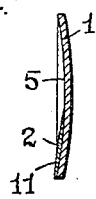
Figure 3:
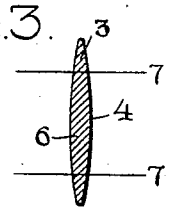
Figure 4:
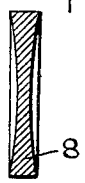
Figure 5:
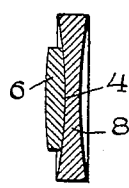
Figure 6:
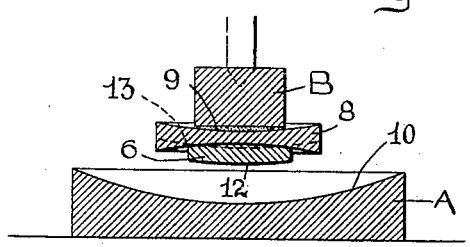
Figure 7:
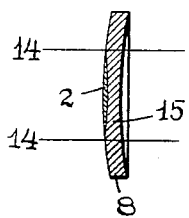
Figure 8:
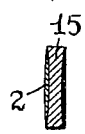
Figure 9:
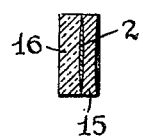
Figure 10:
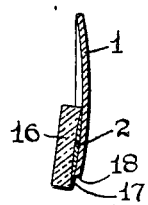

Figure 1 represents a front view of an eyeglass containing a pair of bifocal lenses. Fig. 2 represents one of the bifocal lenses in sectional view on line 2 2, Fig. 1. Figs. 3 and 4 are sectional views of respectively convex and concave lenses representing two common commercial forms. Fig. 5 represents in sectional view the central portion of the lens shown in Fig. 3, which is to form the segment, attached by adhesive material to one side of the concave lens shown in Fig. 4, which is to form a backing for the segment during the process of grinding. Fig. 6 represents in sectional view part of the grinding mechanism of a lens-grinding machine and comprising the concave lap A and the reciprocating block B with the united lenses shown in Fig. 5 attached to the block by adhesive material. Fig. 7 represents in sectional view the form of the segment and its backing after the operation of grinding has been performed. Fig. 8 represents the segment attached to a portion of the backing in position between its edge ground. Fig. 9 represents the segment with a portion of its backing attached to one side and the transfer-block attached to the opposite side, and Fig. 10 illustrates the method of transferring the segment to the lens of the eyeglass.

Similar reference letters and figures refer to similar parts in the different views.

The object of my present invention is to enable the segment attached to the lens of an eyeglass in bifocal lenses to be ground extremely thin, with the edges of the segment to be brought to a thin or knife edge, so that when the segment is attached to the lens of the eyeglass no appreciable shoulder will be formed by the edge of the segment, and I accomplish this result, notwithstanding the extreme fragility of the segment, by the process hereinafter described, and illustrated in the accompanying drawings, in which—

1 denotes one of the lenses of an eyeglass, and 2 the segment attached thereto.

3 represents a double-convex lens, having one of its convex faces 4 corresponding in curvature to the concave side 5 of the lens 1.

I cut a circular piece 6 from the center of the lens 3 on the lines 7 7, from which the segment 2 is to be ground, and I attach the piece 6 by its side 4 to one side of a double-concave lens 8, as represented in Fig. 5, the attachment of the two pieces 6 and 8 being secured by means of an adhesive material, such as Canada balsam. The lens 8, which is to form a backing for the segment during the operation of grinding, is then attached to the reciprocating block B of an ordinary lens-grinding machine by any suitable adhesive material (represented at 9)—such, for example, as pitch or sealing-wax.

A denotes the lap of an ordinary lens-grinding machine having a concave surface 10 corresponding to the convex outer surface 11 of the segment. Abrasive material is applied to the lap A in the usual manner, and a reciprocating motion is given to the block B, with the surface 12 of the piece 6 in contact therewith, by which the edge 6 and backing 8 are ground away on the curved line 13. The grinding operation not only determines the curvature of the surface 11 of the completed segment, but it also determines the diameter of the segment, for the longer the grinding is continued and the thinner the segment is ground the less the diameter of the segment becomes, and this grinding is continued until the segment is brought to the desired diameter. The backing 8 is then removed from the block B with the ground segment 2 thereon, as shown in Fig. 7. The outer edge of the backing 8 is then broken away on lines 14 14, forming a central circular piece 15, the edge of which is then ground until the grinding has slightly removed the extreme tenuous edge of the segment 2, bringing it to a true circular form and giving it a smooth and solid edge.

In some cases the segment 2 may be slipped from the piece 15 directly to the lens 1 of the eyeglass by warming the piece 15 sufficiently to release the segment. When the segments 2, however, are ground extremely thin, it is not practicable to thus transfer them, and in such cases I attach a transfer-piece 16 to the opposite surface of the segment 2 by an adhesive material, such as Canada balsam, and then remove the backing 15 by warming it, leaving the segment 2 securely attached to the transfer-piece 16 and in position to be attached in the usual manner to the lens 1. After the attachment of the segment 2 to the lens 1 in proper position and the removal of the transfer-piece 16 the overhanging edge 17 of the segment is ground away to fit the curved edge 18 of the lens.

What I claim as my invention, and desire to secure by Letters Patent, is—

1. That improvement in the art of making a bifocal lens, which consists in providing a segment-piece with a backing interposed between said segment-piece and the reciprocating block of a grinding-machine, and in grinding the surface of said segment-piece in a plane cutting the supporting-surface of the backing, whereby the diameter of the segment is determined.

2. That improvement in the art of making a bifocal lens, which consists in grinding a segment-piece in a lens-grinding machine when attached to a backing capable of being ground to correspond with the ground surface of said segment-piece.

3. That improvement in the art of making a bifocal lens, which consists in interposing a backing between the segment-piece and the reciprocating block of a lens-grinding machine, grinding the face of the lens in a plane cutting the supporting-surface of said backing, whereby the segment-piece is brought to a thin edge and of the desired diameter of the segment.

4. That improvement in the art of making a bifocal lens, which consists in attaching a segment-piece to a backing interposed between the segment-piece and the reciprocating block of a lens-grinding machine, grinding the face of the segment-piece to the desired diameter of the segment, and transferring the ground segment to the lens of an eyeglass.

5. That improvement in the art of making a bifocal lens, which consists in attaching a segment-piece to a backing interposed between the segment-piece and the reciprocating block of a lens-grinding machine, grinding the segment-piece to the desired diameter, reducing the diameter of the backing to the diameter of the segment and edge-grinding the segment while attached to said backing.

6. The method of making a bifocal lens, consisting in grinding a segment-piece while attached to a backing interposed between the segment-piece and the reciprocating block of a lens-grinding machine, reducing the diameter of the backing to the diameter of the segment, edge-grinding the segment while attached to the backing, attaching a transfer-piece to the ground face of said segment, removing the backing, attaching the segment to the lens of an eyeglass and removing the transfer-piece.

ALBERT J. BOWERS.

Witnesses:
    PENELOPE COMBERBACH,
    RUFUS B. FOWLER.